United States Statutory Invention Registration [19]

[11] Reg. Number: H601

Carlton et al. [43] Published: Mar. 7, 1989

[54] CERAMIC FIBER THERMAL PROTECTION COATING

[75] Inventors: Lloyd C. Carlton, Gloucester; Julie A. Finnegan, Newport News, both of Va.

[73] Assignee: The United States of America as represented by the Secretary of the Navy, Washington, D.C.

[21] Appl. No.: 134,417

[22] Filed: Dec. 17, 1987

[51] Int. Cl.[4] ..... C08L 63/00; C03C 3/083

[52] U.S. Cl. ..... 523/443; 523/445; 523/451; 501/38; 501/55

*Primary Examiner*—John F. Terapane
*Assistant Examiner*—Eric Jorgensen
*Attorney, Agent, or Firm*—William C. Townsend; Kenneth E. Walden

[57] ABSTRACT

An asbestos-free intumescent thermal protection coating consisting essentially of from 0.5 to 1.5 weight percent of a ceramic fiber that comprises from 40 to 50 weight percent of $Al_2O_3$, 50 to 60 weight percent of $SiO_2$, from 0.5 to 1 weight percent of $Fe_2O_3$, and from 1.2 to 2 weight percent of $TiO_2$, the fiber having the dimensions of less than 3.2 millimeters in length and from 0.8 to 1.2 micrometers in diameter and from 98.5 to 99.5 weight percent of a polysulfide-epoxide binder. The binder may include a filler.

14 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CERAMIC FIBER THERMAL PROTECTION COATING

The invention described herein may be manufactured and used by or for the Government of the United States of America for Governmental purposes without the payment of any royalties thereon or therefor.

BACKGROUND OF THE INVENTION

This invention relates to a material having properties of providing heat insulation by withstanding elevated temperatures. In particular, this disclosure teaches a material that is environmentally safe and has the requisite thixotropic properties required to resist slumping.

BACKGROUND OF THE INVENTION

An intumescent coating is used to thermally protect many Navy munition systems in the event of fire. In the past, the Government has utilized a coating produced by Pfizer, Inc. marketed under the trade name of Firex 2370A TM. This intumescent coating consisted of three main parts. The largest part of the material was a binder. A polysulfide-epoxide, a two-part resin, formed the binder to act as a binding material for the constituent components of the material and to act as a glue to adhere the coating to a substrate. The second part of the thermal protection coating was a filler such as phosphate and a borate in the form of ammonium and/or sodium salts. The filler is in the form of a fine powder and was added to the polysulfide part of the two-part resin. The filler salts outgassed and helped form the char and expand it to many times the original thickness. The filler also released water or hydration as steam and helped cool the char.

Both the binder and filler used in the old material were conventional and known to those skilled in the art of thermal protection coatings. U.S. Pat. No. 4,001,126 issued to Marion, et al. on Jan. 4, 1977 described the polysulfide-epoxide binder and the filler, along with the method of producing and curing the same.

The third functional part of the thermal protection coating used by the Government and produced under the tradename of Firex 2370A was an asbestos fiber. The fiber was added to the material to change the mechanical properties of the compound to prevent slumping or running during application and to add some strength to the char after formation.

The addition of the asbestos was required to meet the rigid requirements of thermal protection coatings used to coat defense ordnance. Heretofore only coatings containing asbestos fibers met the military specifications required for defense use. In fact, only the material marketed by Pfizer, i.e., Firex 2370A, was approved for use on Navy ordnance and Pfizer was the only approved, qualified manufacturer of the material.

Research began in Navy Weapon Laboratories several years ago to find a replacement fiber to substitute for the asbestos because of the environmental hazards and associated increasing legal liability. The Naval research and development community conducted research for several years without success.

Pfizer, Inc. notified the Navy by letter of Jul. 30, 1985 that they would cease production of the only qualified thermal protection coating as of Aug. 15, 1985 due to the potential legal liability associated with the use of asbestos in the compound.

Applicants began an accelerated research program to find a substitute material. Research was conducted throughout the Navy's Research and Development programs and NAVAIR pursued a filing of a Title I action through the Department of Commerce to force Pfizer to continue production. The Title I action was not completed for reasons unrelated to the research effort.

The research was directed toward finding a fiber to replace the asbestos in its many industrial and defense applications. Several fibers, such as glass, quartz, stainless steel and ceramic were tested using conventional binders and fillers. None of the fibers tested resulted in a coating comparable to those containing asbestos in terms of the coating's thixotropic properties, without reducing thermal efficiency or increasing viscosity which precluded spray application.

SUMMARY OF THE INVENTION

An object of the invention is to produce an intumescent coating for heat insulating ordnance for fire protection.

Another object of the present invention is to provide a thermal protection coating that does not sag when applied to a vertically oriented substrate.

A further object of the present invention is to provide a thermal protection coating that is environmentally safe.

Another object of the present invention is to provide a thermal protection coating that does not sag and does not require a thickening agent.

A further object of the instant invention is to provide a thermal protection coating that is less expensive than those presently used.

Still another object is to provide a thermal coating which can be applied by spraying.

Yet another object of the present invention is to provide an asbestos free thermal protection coating that is high in thermal efficiency.

Yet another object of the present invention is to provide a thermal protection coating that utilizes known commercially available binders and fillers.

Another object of the present invention is to provide a thermal protection coating that produces a char with unbroken physical integrity.

These and other objects are obtained by the material hereinbelow disclosed. The material constituting this invention is a sprayable thermal coating containing 0.5 to 1.5 percent weight of a ceramic fiber in combination with 98.5 to 99.5 weight percent of a polysulfide-epoxide binder. A filler may be added approximately 65 to 90 parts by weight to 100 parts by weight of the binder.

The polysulfide-epoxide binders are old in the art and described in U.S. Pat. No. 4,001,126 issued to Marion et al. The ceramic fiber is one having a high surface area in relation to weight and is the only material found to provide the anti-sag properties equal to, or greater than, asbestos.

DETAILED DESCRIPTION OF THE INVENTION

This invention teaches a fiber for use in thermal proctection coatings and a coating containing the fibers. The fibers are called high surface area because of their high surface area per gram weight. As the term is used herein, it refers to a fiber having at least 2.5 square meters of surface area for each gram of fiber. The length should not exceed 3.2 millimeters and the preferred length is 3 millimeters. Longer fibers are not recommended as they present clogging problems when dispersed with conventional spraying devices.

The fibers consist essentially of 40 to 50 weight percent of $Al_2O_3$, 50 to 60 percent of $SiO_2$, 0.5 to 1 weight percent of $Fe_2O_3$, and 1.2 to 2 weight percent of $TiO_2$. In addition, traces of less than 0.1 weight percent, $K_2O$ and $Na_2O$ are present. Leachable chlorides are less than 10 parts per million.

The high surface area fibers found preferable and herein disclosed had a diameter of 0.8 to 1.2 micrometers and a mean length of 3 millimeters. The fibers are available commercially from Carborundum Inc. and marketed under the trade name FIBERFRAX. The high surface area ceramic fibers are old in the fiber art and used in caulking compounds, plastic mixes, paper products, mastics, and in various coatings and epoxies, but their use in thermal protection coatings were heretofore unknown. The prior art did not suggest their use in coatings used for thermal protection.

Mixes of thermal coatings were prepared using a variety of high temperature fibers. Resulting materials were compared, in terms of thixotropic characteristics of the coating, thermal efficiency, char integrity and ability to be sprayed from a traditional paint spray gun.

EXAMPLE I

Primed aluminum plates were coated with 135 to 185 mils of the material and held in vertical positions to observe the thixotropic characteristics of the coating. The coatings containing the asbestos or the high surface area ceramic fiber behaved in a similar fashion in that neither slumped or ran off the aluminum plates. Those coatings containing the stainless steel, quartz, or other grades of ceramic fibers, did not possess the thixotropic characteristics necessary to prevent slumping or runoff.

Figure 1:
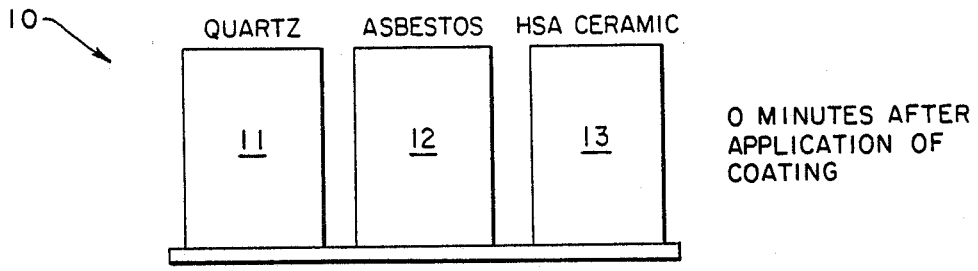
FIG. 1 is a pictorial representation of 3 substrates sprayed with coatings containing quartz fibers, asbestos fibers and ceramic fibers immediately after spraying.

FIG. 1 shows the testing method to ascertain the thixotropic characteristics wherein numeral 10 designates generally the three substrates coated with the materials immediately after testing. Numeral 11 is a pictorial representation of a photograph taken of the substrate sprayed with a thermal protection coating containing quartz fibers; numeral 12 is the same thermal protection coating used in numeral 11 but containing asbestos fibers, and 13 is the same coating containing the high surface area fibers of the present invention.

Figure 2:
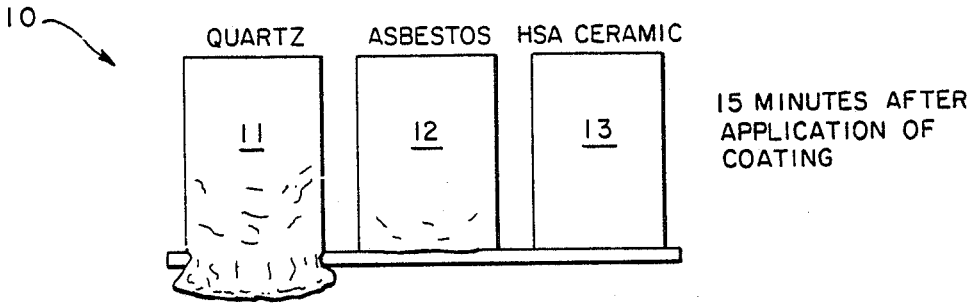
FIG. 2 is the substrates of FIG. 1 15 minutes after spraying.
Figure 3:
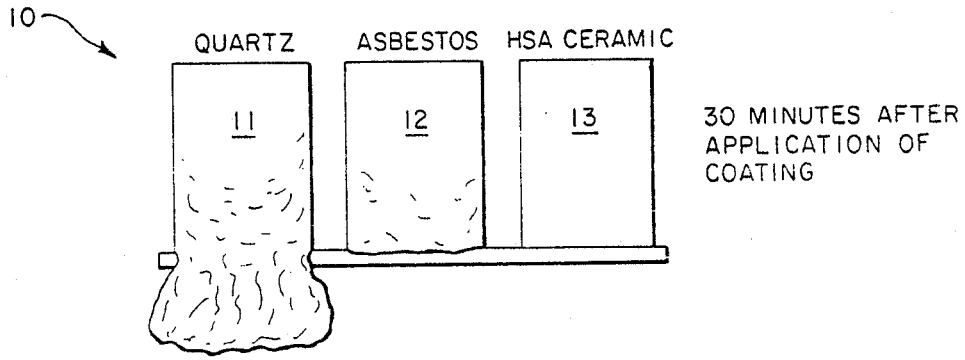
FIG. 3 is the substrates of FIG. 1 30 minutes after spraying.

FIG. 2 shows the same three substrates as FIG. 1 15 minutes after coating. Numeral 11 reveals the sagging associated with the quartz crystals while numeral 12 and 13 show no tendency to sag. Finally, FIG. 3 represents a drawing of photographs taken of the same substrates illustrated in FIG. 1 30 minutes after coating. It is easy to discern that in terms of thixotropic properties, the asbestos 12 and the high surface area ceramic fibers 13 both prevented slumping while the quartz fibers 11 did not.

Various other fibers, including glass, stainless steel and ceramic fibers, all of various grades, were tested in the same manner with only the high surface area ceramic fibers described herein performing as well as asbestos fibers when tested for anti-sagging.

EXAMPLE II

The thermal efficiency was determined by directing the flame from a portable propane torch at the coated surface of an aluminum plate. A chromel-alumel (Type K) thermocouple was attached to the back side of the plate. Millivolt readings were taken each minute after the flame was applied until the plate's back surface reached 525 degrees Fahrenheit. The thermal efficiency of the material containing high surface area ceramic fiber was equivalent to that of the coating containing asbestos. In addition, no differences were detected in the physical integrity of the chars.

The binder tested is described in U.S. Pat. No. 4,001,126 issued Jan. 4th, 1977 to Marion et al. As described in that reference the binder was formed from a mixture of a polysulfide and an epoxide in a ratio in the order of 9 parts to 1 part by weight of polysulfide to from 1 part to 9 parts by weight of epoxide, and preferably from 1 to 4 parts of polysulfide to from 4 to 1 parts by weight of epoxide. A particularly preferred range is 70 parts to 30 parts by weight of polysulfide to 30 parts to 70 parts by weight of epoxide. Typically the two may be approximately equal in weight, or the epoxide may have a percentage by weight in the order of 40 parts to 45 parts per 100 parts of binder and the polysulfide may comprise the balance of the binder. An especially preferred amount is 57.5% by weight of polysulfide and 42.5% by weight of epoxide. The ratio is dependent upon the properties desired for the binder. For example, the epoxide tends to be brittle and glass-like with high tensile strength and low elongation and is subject to shock. The polysulfide tends to provide a high elongation and low tensile strength. It is flexible and rubbery and neither glass-like nor plastic. Variations in the ratios of the polysulfide and the epoxide will affect the physical and structural properties of the cured binder matrix and the rate of cure.

The polysulfides, sometimes termed polyalkylene polysulfide prepolymers, are mercapto-terminated polymers of the general formula $$HS(R—SS)_nRSH$$

where R is a polyvalent organic radical containing at least one methylene group and n is an integer of from about 3 to 100, and preferably from about 3 to 25. Preferred polysulfides include those in which R is $$—C_2H_4OCH_2OC_2H_4—$$

The polysulfides may be prepared by condensation of an alkali metal polysulfide, e.g. sodium polysulfide, with an organic dihalide such as dichlorodiethyl formal, ethylene dichloride, or dichloroethyl ether, as described in Industrial and Engineering Chemistry, Volume 43, pp. 324–B (1951). Small proportions, e.g. 0.5–2% of trichloropropane or other polyhalides are often included with the dihalide. The polysulfides range in property from mobile to viscous liquids to solids at room temperature, depending on molecular weight. Those of liquid form are ordinarily preferred.

The epoxides, also referred to as glycidyl polyether resins, are epoxy-terminated polymers of the general formula

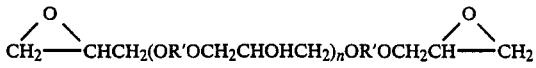

where R' is the divalent organic radical of a dihydric alcohol or a dihydric phenol and n usually has a value of from about 1 to 20. Preferred epoxides include those in which R' is

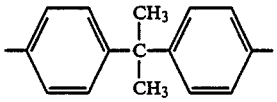

The epoxides may be prepared by condensation of epichlorhydrin in alkaline medium with a dihydric alcohol or a dihydric phenol such as Bisphenol A. The epoxides range in property from viscous liquids to low melting solids, depending on molecular weight or degree of condensation. The degree of condensation is indicated by the epoxide equivalent, defined as the grams of resin per one gram equivalent of epoxy. Epoxides are prepared with epoxide equivalents ranging from about 140 to 4000, but those of about 185 to about 300 are usually preferred since these are in liquid form at room temperature.

The filler, if one is used, may constitute a mixture of a phosphate and a borate, suitably in the form of ammonium and/or sodium salts. Preferably the filler may constitute a mixture of monobasic ammonium phosphate ($NH_4H_2PO_4$) or dibasic ammonium phosphate $(NH_4)_2HPO_4$ and anhydrous sodium borate ($Na_2B_4O_7$). It will be appreciated, however, that the two fillers may be monobasic or dibasic sodium phosphate and anhydrous ammonium borate without materially affecting the advantages of the resultant material. The phosphate may constitute about 10 parts to 155 parts by weight and the borate may constitute about 10 parts to 110 parts by weight, per 100 parts of binder. Preferably, the phosphate comprises about 10 to 80 parts by weight and the borate comprises about 25 to 80 parts by weight, per 100 parts of binder. Typically the anhydrous sodium borate may comprise 55 parts by weight and the monobasic ammonium phosphate may comprise 45 parts by weight. The filler may constitute in the order of 50 parts to 300 parts by weight relative to 100 parts by weight of the binder. Preferably the filler constitutes approximately 65 to 90 parts by weight to 100 parts by weight of the binder.

The material constituting the binder may be formed from two separate mixtures which are stored separately, preferably in liquid form, until the material is desired to be formed. One of the mixtures constitutes the polysulfide and proportional share of the fillers, which may, for example, be fine powders of approximately 200 mesh. Actually, a greater proportion of the fillers can be added to the polysulfide than the proportion in the total mixture since the polysulfide is often less viscous than the epoxide. The first mixture can be stored for an indefinite period of time at ambient temperatures without losing its effectiveness.

In the curing of the compositions of this invention, the polysulfide component is capable of condensation with the epoxide component to effect cross-linking by interaction between the mercapto group and the epoxy group. This interaction is promoted by inclusion of a curative or accelerator. Appropriate accelerators are the aliphatic and aromatic primary, secondary and tertiary amines, generally employed at levels up to about 15 parts per 100 parts epoxide. Preferred polyfunctional amine curatives include 2,4,6-(dimethylaminomethyl)-phenol, diethylenetriamine, and dimethylaminopropylamine. Other suitable amine curatives include dimethylaminomethyl phenol and benzyldimethylamine.

A curative for the epoxide is included in the first mixture. This curative is preferably a polyamine in order of approximately 8 to 12% by weight of the epoxide. However, the range of polyamines may range between approximately 0 to 25% by weight of the epoxide. Typically the polyamines have represented about 10% by weight of the epoxide. However, polyamides and/or acid anhydrides may be also used. The polyamines and polyamides can be used together as curatives but the acid anhydrides have to be used alone. When polyamides are used as the curative, their weight can range between 25 to 200% by weight of the epoxide. A typical level would be 50% by weight of the epoxide.

Preferred polyamide curatives are the reaction products of polymeric fatty acids with polyamines. The polymeric fatty acids may, for example, be dimerized and trimerized unsaturated fatty acids derived from drying oils such as soybean oil, linseed oil, tung oil and the like. The polyamines employed for the preparation of polyamide curatives include ethylenediamine, diethylenetriamine and the like.

The second mixture constitutes the epoxide and a proportionate share of the fillers, which may be fine powders of approximately 200 mesh. The second mixture is also in liquid form and can be stored for an indefinite period of time at ambient temperatures without losing its effectiveness. When it is desired to produce the cured material constituting this invention, the first and second mixtures are mixed at ambient temperatures in the desired proportions and the resultant material is allowed to set. After a short period, e.g., overnight, the resultant material is relatively solid and has developed approximately 70 to 90% of its ultimate strength. The material can be used in most applications even after this relatively brief period of time. Preferably, however, the resultant material is allowed to set for an extended period of time in the order of a week before it is used.

Although the combined first and second mixtures are preferably cured at room temperatures, they may be cured at temperatures up to 180 ° or 190° F. The combined first and second mixtures are preferably cured at room temperatures since this simplifies the procedure of forming the resultant material. When the combined first and second mixtures are cured at elevated temperatures, the curing process tends to become accelerated. However, when an acid anhydride is used as the curative, the resultant mixture is preferably cured at elevated temperatures in the order of 250° to 350° F.

The binder used in the thermally protective material has certain important advantages. When subjected to heat at high temperatures in the thousands of degrees Fahrenheit, it forms a char structure at the surface receiving the heat and at progressive positions inwardly from the surface. This char structure is characterized by the formation of carbonaceous skeletons of hydrocarbons and is further characterized by the formation of carbon approaching a graphite structure having pyrolytic properties. A pyrolytic structure is desirable since it tends to provide for a lateral transfer of heat through the structure so that the transfer of heat through the material from the surface receiving the heat to the opposite surface is minimized. The pyrolytic char structure is characterized by a pyrolysis of hydrocarbons in a deficiency of oxygen to form carbon-carbon chains.

The char formed from the binder included in this invention is one type of a rigid cellular material created by pyrolysis. It is desirable in the thermally-protective material for a number of reasons. One reason is that the char is porous so that it is able to provide transpirational cooling by the passage of gases through the material and the escape of the gases from the material. The transpirational cooling is provided because the gases absorb heat from the structure as they pass through the structure. However, the char is not excessively porous since it would otherwise allow the gas to move explosively through the char and disrupt and weaken the char. Another reason is that the char constitutes a black body and is accordingly able to reflect and radiate from the surface of the char a substantial portion of the heat directed toward the surface. Further advantages of the char are that it is hard and does not crack easily. If the char would crack easily, it would lose its properties of providing thermal insulation.

The formation of the char is obtained primarily from the pyrolysis of the benzene ring provided by the epoxide. The pyrolysis of the polysulfide yields simple compounds which tend to break down and become gaseous. Because of this, it is desirable to have a considerable amount of the epoxide in the binder. However, it is not desirable to reduce the amount of the polysulfide excessively because the polysulfide contributes elasticity to the heat-protective material.

When the fillers are subjected to heat, they undergo a series of chemical reactions each having endothermal characteristics to absorb heat and each occurring at a relatively small temperature increment above the previous chemical reactions. For example, when anhydrous sodium borate and monobasic ammonium phosphate are used as the filler material, the monobasic ammonium phosphate is decomposed chemically through several successive steps to form metaphosphoric acid ($HPO_3$), ammonia and water. The water then causes the anhydrous sodium borate to become converted to a hydrate form of sodium borate. This hydrate form then becomes progressively decomposed through several successive chemical steps to boric oxide, sodium hydroxide and water. The chemical reactions are regenerative since the water formed from the decomposition of the monobasic ammonium phosphate tends to convert the anhydrous sodium borate to a hydrate form of sodium borate.

The chemical decomposition of the monobasic ammonium phosphate occurs initially at a temperature of approximately 100° C. It occurs at the positions where the binder is being converted to a char. The chemical decomposition is as follows:

$$2NH_4H_2PO_4 \rightarrow 2H_3PO_4 + 2NH_3 \quad (1)$$

The ammonia gas then escapes through the char structure which is produced from the binder. The decomposition of the monobasic ammonium phosphate as indicated in equation (1) causes approximately 59 kilocalories of heat per mole to be absorbed since the decomposition is endothermic. Furthermore, the ammonia absorbs heat from the char structure as it moves through the char.

The phosphoric acid produced as in equation (1) then becomes decomposed at a temperature of approximately 225° C. as indicated in the following chemical equation:

$$2H_3PO_4 \rightarrow H_4P_2O_7 + H_2O \quad (2)$$

This reaction is also endothermic and causes approximately 16.6 kilocalories of heat per mole to be absorbed. The water produced from this reaction tends to be absorbed by the anhydrous sodium borate to produce a hydrate form of sodium borate.

The tetraphosphoric acid ($H_4P_2O_7$) produced from the reaction of equation (2) further decomposes at a temperature of approximately 290° C. to produce metaphosphoric acid and water. This is expressed chemically as follows:

$$H_4P_2O_7 \rightarrow 2HPO_3 + H_2O \quad (3)$$

This decomposition is also endothermic and causes approximately 23.8 kilocalories of heat per mole to be absorbed. The metaphosphoric acid is a vitreous compound which sublimes at a temperature above approximately 900° C. However, the metaphosphoric acid does not sublime until all of the chemical reactions indicated above and below have taken place since all of these chemical reactions occur at temperatures considerably below 900° C. Until it sublimes, the metaphosphoric acid serves as a binder in the thermally-protective material constituting this invention. The subliming action occurs on an endothermal basis so that further heat is absorbed.

The molecules of water produced in equation (1) and (3) are combined with the anhydrous sodium tetraborate in the following chemical reaction:

$$Na_2B_4O_7 + 2H_2O \rightarrow Na_2B_4O_7 . 2H_2O \quad (4)$$

This reaction is desirable because the anhydrous sodium borate melts at a temperature of approximately 741° C. and does not decompose chemically at any temperature below 741° C. However, the hydrate form of the sodium borate decomposes at a temperature of approximately 100° C. as indicated below:

$$Na_2B_4O_7 . 2H_2O \rightarrow 4HBO_2 + Na_2O \quad (5)$$

This decomposition occurs on an endothermic basis with an absorption of approximately 99.4 kilocalories of heat per mole.

The chemical product $HBO_2$ further decomposes at a temperature of approximately 167° C. in the following chemical reaction:

$$4HBO_2 \rightarrow H_2B_4O_7 + H_2O \quad (6)$$

This decomposition is also on an endothermic basis. The sodium oxide produced from equation (5) and the water molecules produced from equation (6) then combine to produce sodium hydroxide as indicated below:

$$Na_2O + H_2O \rightarrow 2NaOH \quad (7)$$

Sodium hydroxide has a melting temperature of approximately 318° C. and a boiling point of approximately 1390° C. When the sodium hydroxide melts and boils, it absorbs heat. The boiling of the sodium hydroxide may be seen by the yellow flame at the surface of the char.

The boric acid in turn decomposes to produce boric oxide as indicated below:

$$H_2B_4O_7 \rightarrow 2B_2O_3 + H_2O \quad (8)$$

This decomposition occurs at a temperature of approximately 276° C. on an endothermal basis. The boric oxide is a glass which is compatible with the carbon structure constituting the char and which has a melting temperature of approximately 577° C. and a boiling temperature of approximately 1500° C. When tested at flame temperature of 1800° F. very little molten glass is evident on the surface of the char. However, the molten glass is quite evident when the material is tested at temperatures approaching 3000° F. but the molten glass is retained by the carbonaceous char structure. In the flame of an oxygen-acetylene torch at approximately 4500° F., a small portion of the boric oxide does melt and low but a substantial portion is vaporized.

The water produced from the chemical reaction indicated as equation (8) is combined with the anhydrous sodium borate to produce a hydrate form of the sodium borate. This facilitates the decomposition of the sodium borate as discussed above until the sodium tetraborate becomes a decahydrate having the formula $Na_2B_4O_7.10H_2O$. Any excess water is absorbed to form sodium hydroxide after the quantity required to catalyze the decomposition process has been provided.

There are certain advantages to the sequence of chemical reactions discussed above. One advantage is that one of the filler materials, the anhydrous sodium tetraborate, is more stable than all of the decomposition products except for the metaphosphoric acid finally produced from the decomposition of the monobasic ammonium phosphate. Another advantage is that a number of chemical reactions occur between a temperature of approximately 100° C. (equations 1 and 5) and a temperature of 290° C. (equation 3). The greatest temperature increment occurs between 100° and 167° C. (equations 5 and 6) and the smallest temperature increment occurs between 276° and 290° C. (equations 3 and 8).

By providing a sequence of chemical reactions and chemical decompositions at progressive temperature increments of relatively small value, the passage of heat through the material from the surface receiving the heat to the opposite surface is minimized.

The formation of the char from the binder tends to facilitate the chemical decomposition of the filler materials in its successive steps. The reason is that the char is porous so that the gases produced by the chemical reactions indicated above tend to move through the char toward the surface of the material receiving the heat. In particular, the movement of the water molecules through the char tends to facilitate the conversion of the anhydrous sodium tetraborate to the hydrate form of the sodium tetraborate on a regenerative basis. Furthermore, the porous nature of the char tends to facilitate transpirational cooling of the char since the gases absorb heat as they move through the char.

When the gases passing through the char reach the surface of the char, they tend to form a reflective surface in front of the surface of the thermally-protective material receiving the heat. The reflective surface formed by the gases tends to inhibit the passage of heat into the thermally-protective material. Furthermore, the gases tend to absorb additional heat after they form the reflective surface in front of the thermally-protective surface receiving the heat. It will be appreciated that most of the gases produced by the chemical reactions and decompositions described above are noninflammable. Furthermore, the use of water on a regenerative basis to provide a hydrate form of the tetraborate. and to convert sodium oxide to sodium hydroxide is beneficial in preventing deleterious reactions of water with carbon. Otherwise, carbon and water vapor would tend to react rapidly at high temperature such as the red-hot surface of a material receiving heat. This reaction would tend to disrupt the surface of the material so that the material would tend to become weakened. Furthermore, it would cause different areas to become exposed so that further chemical reactions of the carbon and water vapor would tend to occur on a progressive basis. It would also tend to deprive the char of carbon molecules so as to weaken the char.

The char structure tends to be strengthened by the refractory compounds of the vitreous metaphosphoric acid ($HPO_3$) and glass-like boric oxide constituting the end products in the chemical reaction indicated above. These refractory compounds solidify to cement and reinforce the carbonaceous char structure.

The decomposition and sublimation products have been successfully formulated to provide a reducing atmosphere within and around the char structure. This may be seen in part from the fact that the char structure is not consumed until the substate material has been completely depleted and ceases to produce the effluent gases and vapors.

It will be appreciated that other materials may be used than those discussed above. For example, borax ($Na_2B_4O_710H_2O$) may be used in place of anhydrous sodium borate as one of the materials in the filler.

The range of the borax by weight may be 17 to 260 parts to approximately 100 parts by weight of binder. Preferably the borax has a range of 25 to 80 parts by weight to 100 parts by weight of binder. Typically the borax constitutes 55 parts by weight to 100 parts by weight of binder. When borax is used, the following decomposition occurs:

$$Na_2B_4O_7.\ 10H_2O + 4Na_2B_4O_7 \rightarrow 5Na_2B_4O_7.\ 2H_2) \quad (9)$$

The hydrate form of sodium tetraborate then decomposes in a manner indicated in equations (5) to (8) above. Borax is not as advantageous as the anhydrous sodium tetraborate since the ten moles of water per mole of the tetraborate tend to decompose at high rates when in the presence of carbon and form carbon monoxide and carbon dioxide. The formation of carbon monoxide and carbon dioxide tends to deprive the char of carbon and accordingly to weaken the char.

Other materials may also be used as the fillers within the scope of the invention. For example, ammonium biborate ($NH_4HB_4O_7.3H_2O$), sodium hydrogen phosphate ($Na_2HPO_4$), sodium and calcium hydrogen phosphate ($CaH_4(PO_4)_2).H_2O$ may also be used. Preferably, the phosphates are substituted for the monobasic ammonium phosphate listed above in equation (1) so that this material can be involved in the series of reactions with the tetraborate where each reaction occurs at a relatively small increment of temperature above the previous reaction. Similarly the biborate is substituted for the borate listed above in equation (1). Other materials such as other borates may be substituted for the tetraborates specified above without departing from the scope of the invention. Furthermore, other metallic elements such as potassium, lithium, rubidium, cesium, barium, strontium, magnesium and calcium may be substituted for sodium in the tetraborate without departing from the scope of the invention. When ammonium biborate is used it may have a range of 17 to 100 parts by weight to 100 parts of binder. Preferably the ammonium biborate has a range of 25 to 80 parts by weight to 100 parts by weight of binder. Typically the ammonium biborate has a weight of 55 parts to 100 parts by weight of binder.

In addition to the above, other materials may also be used in the filler. For example, titanium dioxide ($TiO_2$), calcium hydroxide ($Ca(OH)_2$), aluminum hydroxide ($Al(OH)_3$ and zirconium dioxide ($ZrO_2$) may be included in the filler. These fillers may be used singly or with other fillers. The hydroxides tend to lose their water molecules when subjected to heat so that the oxides of the metals are produced. The water molecules then tend to combine with the anhydrous form of the tetraborate for facilitating the chemical decomposition of the tetraborate. The oxides of the metals tend to be chemically inert so that they do not decompose to absorb heat. However, the oxides and hydroxides tend to contribute to the reflection and re-radiation of the heat from the surface of the heat-protective material. The oxides and hydroxides of the metal provide a relatively increased protection in the thermally-protective material against heat at a temperature of approximately 5000° F. than at a temperature of approximately 3000° F.

Other fillers may be used in the percentages indicated below per 100 parts by weight of binder:

| Material | Parts by Weight |
|---|---|
| Calcium Phosphate $CaH_4(PO_4)_2$ | 86 |
| Sodium phosphate, tribasic | 85 |
| Sodium phosphate, pyrophosphate | 85 |
| Sodium oxalate | 85 |
| Calcium oxalate | 37 |
| Ammonium bromide | 4–10.2 |
| Ammonium sulfate | 10–85 |
| Potassium carbonate | 85 |
| Sodium carbonate | 85 |
| Calcium sulfate | 85 |
| Aluminum hydroxide | 40–85 |
| Calcium hydroxide | 38.7–85 |
| Zirconium hydroxide | 85 |
| Titanium dioxide | 34–52.5 |
| Magnesium oxide | 17 |
| Aluminum oxide | 42.7–57.7 |
| Potassium chloride | 85 |
| Potassium bromide | 1–4 |
| Aluminum fluoride | 50.6 |
| Graphite | 34 |
| Eccospheres R. silica microballoons | 17–24 |
| Fumed Silica ($SiO_2$) | 3–11 |
| Mica | 35 |

In addition to the advantages described above, the heat-protective material has certain additional advantages. One advantage is that the material can be applied in liquid, plastic or solid form of any desired thickness to the member to be insulated. The heat protective material can be bonded to any practical surface to provide effective insulation between that surface and a source of heat. The material is capable of retaining this bond and its heat-insulating properties and its structural integrity at ambient temperatures between approximately 65° and 185° F. for extended periods of time, even when subjected continuously for prolonged periods of time to temperatures near the extremes of this range. The material is resistant to water, oil, gasoline and solvents such as toluene. However, the material does exhibit slight swelling when immersed in toluene for approximately 30 days and does experience somewhat more swelling when immersed in acetone for approximately 30 days.

It is important to note that various binders and fillers besides those described in U.S. Pat. No. 4,001,126 and discussed herein are known to those skilled in the art. The present invention does not depend upon the filler or binder selected. Additional binders, fillers and examples of their use along with the disclosure concerning the binder herein, are revealed in U.S. Pat. No. 4,001,126 issued to Marion, et al on Jan. 4, 1977.

Obviously, many modifications and variations of the present invention are possible in light of the above teachings. It is therefore to be understood that, within the scope of the appended claims, the invention may be practiced otherwise than as specifically described.

What is claimed as new, useful and unobvious and entitled to be secured by Letters Patent is:

1. An environmentally safe protective coating capable of being sprayed on a vertical substrate without sagging consisting essentially of:

a polysulfide epoxide binder wherein the range of polysulfide is 1 part to 4 parts by weight to 4 parts to 1 part epoxide by weight, and at least one filler, including phosphates and borates, wherein the phosphates are selected from a group consisting of sodium and ammonium phosphate and the borates selected from a group consisting of sodium and ammonium borate, dispersed evenly in said binder in a range of 10 to 80 parts of at least one of the fillers to 100 parts of said binder, and, a ceramic fiber comprising 40 to 50 weight percent of $Al_2O_3$, 50 to 60 weight percent of $SiO_2$, from 0.5 to 1 weight percent of $Fe_2O_3$, and from 1.2 to 2 weight percent of $TiO_2$, said fibers having a length less than 3.2 millimeters and a diameter from 0.8 and to 1.2 micrometers, and dispersed in said binder and said filler in a range of 0.5 to 1.5 weight percent fiber to 98.5 to 99.5 percent of said binder and said filler.

2. A thermal protection coating according to claim 1 wherein:

said binder is selected from a group consisting of mercapto-terminated polymers and epoxy-terminated polymers, the mercapto-terminated polymers and epoxy-terminated polymers being cross-linked, the mercapto-terminated polymers having the general formula;

$$HS(R—SS)n\ RSH$$

where R is a polyvalent organic radical containing at least one methylene group and n is an integer of from about 3 to 100, and preferably from about 3 to 25 and the epoxy-terminated polymers having the general formula;

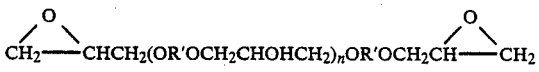

where R′ is the divalent organic radical of a dihydric alcohol or a dihydric phenol and n usually has a value of less than 1 to a value of about 20, the material selected from a group consisting of the aliphatic and aromatic primary, secondary and tertiary amines and having properties of cross-linking the mercapto-terminated polymers and the epoxide-terminated polymers, the material selected for cross-linking the mercapto-terminated polymers and the epoxide-terminated polymers having a percentage by weight of approximately 15 parts to 100 parts by weight of the epoxide-terminated polymers.

3. A thermal protection coating according to claim 2 wherein:

at least one filler includes phosphates and borates, the phosphates being selected from a group consisting of sodium and ammonium phosphate and the borates being selected from a group consisting of sodium and ammonium borate, the filler materials being uniformly dispersed in the binder in about 10 to 80 parts by weight of at least one of sodium or ammonium phosphate per 100 parts by weight of binder and from about 25 to 80 parts by weight of at least one of sodium or ammonium borate per 100 parts by weight of the binder.

4. A protective coating according to claim 1 wherein said fiber is essentially proportioned 1 part weight percent to 99 parts weight percent of said binder and said filler in combination.

5. A thermal protection coating according to claim 1 wherein said binder is in the range where polysulfide is 30 to 70 parts to 70 to 30 parts epoxide.

6. A thermal protection coating according to claim 1 wherein said polysulfide is 42.5 weight percent to 57.5 weight percent epoxide.

7. A thermal protection coating according to claim 1 wherein:

at least one filler includes phosphates and borates, the phosphates being selected from a group consisting of sodium and ammonium phosphate and the borates being selected from a group consisting of sodium and ammonium borate, the filler material being uniformly dispersed in the binder in about 10 to 80 parts by weight of at least one of sodium or ammonium phosphate per 100 parts by weight of binder and from about 25 to 80 parts by weight of at least one of sodium or ammonium borate per 100 parts by weight of the binder.

8. A ceramic fiber for use in an intumescent thermal protection coatings comprised essentially of:

40 to 50 weight percent of $Al_2O_3$, and
50 to 60 weight percent of $SiO_2$, and
0.5 to 1 weight percent of $Fe_2O_3$, and
1.2 to 2 weight percent of $TiO_2$.

9. A ceramic fiber according to claim 8 wherein said fiber is less than 3.2 millimeters in length and from 0.8 to 1.2 micrometers in diameter.

10. An environmentally safe protective coating capable of being sprayed on a vertical substrate without sagging consisting essentially of:

a polysulfide epoxide binder wherein the range of polysulfide is 1 part to 4 parts by weight to 4 parts to 1 part epoxide by weight, and a ceramic fiber comprising 40 to 50 weight percent of $Al_2O_3$, 50 to 60 weight percent of $SiO_2$, from 0.5 to 1 percent of $Fe_2O_3$, and from 1.2 to 2 weight percent of $TiO_2$, said fibers having a length less than 3.2 millimeters and for 0.8 to 1.2 micrometers in diameter, dispersed in said binder in a range of 0.5 to 1.5 weight percent fiber to 98.5 to 99.5 percent of said binder.

11. A protection coating according to claim 10 wherein said fiber is essentially proportioned 1 part weight percent to 99 parts weight percent of said binder.

12. A thermal protection coating according to claim 10 wherein said binder is in the range where polysulfide is 30 to 70 parts to 70 to 30 parts epoxide.

13. A thermal protection coating according to claim 10 wherein said polysulfide is 42.5 weight percent to 57.5 weight percent epoxide.

14. A thermal protection coating according to claim 10 wherein:

said binder is selected from a group consisting of mercapto-terminated polymers and epoxy-terminated polymers, the mercapto-terminated polymers and epoxy-terminated polymers being cross-linked, the mercapto-terminated polymers having the general formula;

$$HS(R—SS)_n\ RSH$$

where R is a polyvalent organic radical containing at least one methylene group and n is an integer of from about 3 to 100, and preferably from about 3 to 25 and the epoxy-terminated polymers having the general formula;

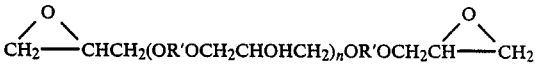

where R′ is the divalent organic radical of a dihydric alcohol or a dihydric phenol and n usually has a value of less than 1 to a value of about 20, the material selected from a group consisting of the aliphatic and aromatic primary, secondary and tertiary amines and having properties of cross-linking the mercapto-terminated polymers and the epoxide-terminated polymers, the material selected for cross-linking the mercapto-terminated polymers and the epoxide-terminated polymers having a percentage by weight of approximately 15 parts to 100 parts by weight of the epoxide-terminated polymers.

* * * * *